United States Patent
Lambert

(10) Patent No.: US 9,402,270 B2
(45) Date of Patent: Jul. 26, 2016

(54) SECURE DEVICE BOOTSTRAP IDENTITY

(71) Applicant: MARVELL WORLD TRADE LTD., St. Michael (BB)

(72) Inventor: Paul A. Lambert, Mountain View, CA (US)

(73) Assignee: MARVELL WORLD TRADE LTD. (BB)

( * ) Notice: Subject to any disclaimer, the term of this patent is extended or adjusted under 35 U.S.C. 154(b) by 1 day.

(21) Appl. No.: 14/482,072

(22) Filed: Sep. 10, 2014

(65) Prior Publication Data

US 2015/0071438 A1    Mar. 12, 2015

Related U.S. Application Data

(60) Provisional application No. 61/875,914, filed on Sep. 10, 2013.

(51) Int. Cl.
| | |
|---|---|
| H04K 1/00 | (2006.01) |
| H04W 76/02 | (2009.01) |
| G06F 9/44 | (2006.01) |
| H04W 12/04 | (2009.01) |

(Continued)

(52) U.S. Cl.
CPC ............. *H04W 76/02* (2013.01); *G06F 9/4416* (2013.01); *G06F 21/36* (2013.01); *G06F 21/44* (2013.01);

(Continued)

(58) Field of Classification Search
CPC ....... H04L 63/06; H04L 63/061; H04L 63/08; H04L 63/0869; H04L 63/0876; H04L 9/08; H04L 9/0816; H04L 9/30; G06F 9/4401; H04W 12/04; H04W 12/06

USPC ................ 380/255, 270, 277, 282, 44; 713/2, 713/168–170; 726/2, 14
See application file for complete search history.

(56) References Cited

U.S. PATENT DOCUMENTS

| | | | | |
|---|---|---|---|---|
| 6,167,514 A | * | 12/2000 | Matsui | .................. G06F 21/608 380/255 |
| 6,614,985 B1 | * | 9/2003 | Tokunaka | ............... A63F 13/12 386/241 |

(Continued)

FOREIGN PATENT DOCUMENTS

| | | |
|---|---|---|
| EP | 2 493 230 A1 | 8/2012 |
| EP | 2 605 170 A2 | 6/2013 |

OTHER PUBLICATIONS

Patent Cooperation Treaty (PCT), International Search Report and Written Opinion, in co-pending PCT International Application No. PCT/US2014/054885 (International Filing Date: Sep. 10, 2014), having a Date of Mailing of Dec. 4, 2014 (8 pgs).

*Primary Examiner* — Hosuk Song

(57) ABSTRACT

Systems, methods, and other embodiments associated with generating transient identifiers are described. According to one embodiment, an apparatus includes a memory device that stores a primary identifier that is unique to the apparatus. The primary identifier correlates with a displayed identifier of the apparatus that is used by a remote device to initiate communications with the apparatus. The apparatus includes identifier logic configured to generate a secondary identifier in response to receiving an association request that includes the displayed identifier when the apparatus is in a bootstrap mode. The bootstrap mode is a state of the apparatus when the apparatus is initializing and will accept a new association. The association request is a wireless communication that initiates establishing secure communications. The apparatus includes communication logic configured to establish secure wireless communications with the remote device by causing the remote device to identify the apparatus using the secondary identifier.

20 Claims, 3 Drawing Sheets

(51) Int. Cl.
*H04L 9/14* (2006.01)
*G06F 21/36* (2013.01)
*G06F 21/44* (2013.01)
*G06F 21/57* (2013.01)
*G06F 21/60* (2013.01)
*G06F 21/73* (2013.01)

(52) U.S. Cl.
CPC ............ *G06F 21/445* (2013.01); *G06F 21/575* (2013.01); *G06F 21/606* (2013.01); *G06F 21/73* (2013.01); *H04L 9/14* (2013.01); *H04W 12/04* (2013.01); *H04L 2209/24* (2013.01)

(56) References Cited

U.S. PATENT DOCUMENTS

| | | | |
|---|---|---|---|
| 6,704,872 B1* | 3/2004 | Okada | G06F 21/123 713/189 |
| 7,069,439 B1* | 6/2006 | Chen | G06F 21/34 380/251 |
| 7,916,594 B2* | 3/2011 | Yang | G11B 19/044 369/47.14 |
| 2009/0019250 A1* | 1/2009 | Rofougaran | G06F 12/0623 711/170 |

\* cited by examiner

SECURE DEVICE BOOTSTRAP IDENTITY

CROSS REFERENCE TO RELATED APPLICATIONS

This patent disclosure claims the benefit of U.S. Provisional Application Ser. No. 61/875,914 filed on Sep. 10, 2013, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Wireless networks provide a convenient way for devices to communicate and access computer networks. Communications between many different types of devices becomes simple when cumbersome wiring is replaced with the ability to connect wirelessly. However, as the popularity of wireless connectivity grows, security issues unique to this form of communication are more likely to be exploited.

For example, to provide security against malicious attacks, devices establish secure relationships to enable encrypting wireless communications. In general, devices may have many different secure relationships. Accordingly, a device may identify a secure relationship with another device according to a unique identifier of a particular device.

However, when ownership of a device is transferred, difficulties may arise because the unique identifier of the device is transferred along with ownership. Thus, previously established secure relationships may still be recognized as valid because the device maintains the unique identifier even though the ownership has transferred. Accordingly, using the unique identifier to establish the secure relationships may cause difficulties with security.

SUMMARY

In general, in one aspect this specification discloses an apparatus. The apparatus includes a memory device that stores a primary identifier that is unique to the apparatus. The primary identifier correlates with a displayed identifier of the apparatus that is used by a remote device to initiate communications with the apparatus. The apparatus includes identifier logic configured to generate a secondary identifier in response to receiving an association request that includes the displayed identifier when the apparatus is in a bootstrap mode. The bootstrap mode is a state of the apparatus when the apparatus is initializing and will accept a new association with the remote device. The association request is a wireless communication that initiates establishing secure communications between the remote device and the apparatus. The apparatus includes communication logic configured to establish secure wireless communications with the remote device by causing the remote device to identify the apparatus using the secondary identifier instead of using the primary identifier.

In another embodiment, the identifier logic is configured to engage the bootstrap mode in response to a reset request. The identifier logic is configured to disable the secondary identifier and generate the secondary identifier again as a different identifier in response to receiving the association request when in the bootstrap mode.

In another embodiment, the association request is from the remote device and includes the displayed identifier. The identifier logic is configured to generate the secondary identifier by generating a new public key for the apparatus. The remote device is a management device that controls the apparatus.

In another embodiment, the identifier logic is configured to generate the secondary identifier by applying a hash function to a public key of a key pair that is assigned to the apparatus. The key pair is an asymmetric key pair that is assigned to the apparatus when the apparatus is manufactured. The primary identifier is the public key.

In another embodiment, the apparatus is configured to display or includes an area that displays the displayed identifier. The displayed identifier is a quick response (QR) code, a passphrase or a truncated hash of the primary identifier. The primary identifier is an out-of-box (OOB) identifier that is assigned to the apparatus by a manufacturer of the apparatus. The primary identifier is a media access control (MAC) address, a public key or a random string.

In another embodiment, the apparatus includes a button configured to, in response to being activated, provide a reset request to the communication logic in response to a button of the apparatus being depressed. The reset request causes the identifier logic to enter the bootstrap mode and to disable the secondary identifier. The identifier logic is configured to generate a new secondary identifier in response to receiving a subsequent association request after entering the bootstrap mode.

In another embodiment, the communication logic is configured to establish the secure wireless communications according to a WiFi protected setup (WPS) protocol. The communication logic is configured to establish the secure communications by using near-field communications to exchange information with the remote device. The remote device is a master device of the apparatus. The communication logic is configured to use elliptic curve cryptography (ECC) to encrypt the secure wireless communications.

In general, in another aspect, this specification discloses a method. The method includes storing, in a memory device of an apparatus, a primary identifier that is unique to the apparatus. The primary identifier correlates with a displayed identifier of the apparatus that is used by a remote device to initiate communications with the apparatus. The method includes generating, by the apparatus, a secondary identifier in response to receiving an association request that includes the displayed identifier when the apparatus is in a bootstrap mode. The bootstrap mode is a state of the apparatus when the apparatus is initializing and is open for a new association. The association request is a wireless communication that initiates establishing secure communications between the remote device and the apparatus. The method includes establishing secure wireless communications with the remote device by causing the remote device to identify the apparatus using the secondary identifier instead of using the primary identifier.

In another embodiment, the method includes engaging the bootstrap mode in response to a reset request. Engaging the bootstrap mode includes disabling the secondary identifier and generating a new secondary identifier in response to receiving the association request when in the bootstrap mode. The primary identifier is an out-of-box (OOB) identifier that is assigned to the apparatus by a manufacturer of the apparatus. The primary identifier is a media access control (MAC) address, a public key or a random string.

In another embodiment, the association request includes the displayed identifier from the remote device. Generating the secondary identifier includes generating a new public key for the apparatus. Establishing the secure wireless communications includes the apparatus receiving management and control commands from the remote device.

In another embodiment, generating the secondary identifier includes applying a hash function to a public key of a key pair that is assigned to the apparatus. The key pair is an asymmetric key pair that is assigned to the apparatus when the apparatus is manufactured. The primary identifier is the public key.

In another embodiment, the displayed identifier is displayed on the apparatus. The displayed identifier is a quick response (QR) code, a passphrase or a truncated hash of the primary identifier.

In another embodiment, a reset request is provided in response to a button of the apparatus being depressed. Generating the secondary identifier includes generating a new secondary identifier in response to receiving a subsequent association request after engaging the bootstrap mode.

In another embodiment, establishing the secure wireless communications uses a WiFi protected setup (WPS) protocol. Establishing the secure wireless communications uses near-field communications to exchange information with the remote device. The remote device is a master device of the apparatus. Establishing the secure wireless communications includes using use elliptic curve cryptography (ECC) to encrypt the secure wireless communications.

In general, in another aspect, this specification discloses a communication device. The communication device includes a memory device that stores a primary identifier that is unique to the communication device. The primary identifier correlates with a displayed identifier of the communication device that is displayed on a label of the communication device. The communication device includes identifier logic configured to (i) engage a bootstrap mode for initializing the communication device and (ii) generate a secondary identifier in response to receiving an association request when the communication device is in a bootstrap mode. The bootstrap mode is a state when the device accepts association requests. The association request is a wireless communication that initiates establishing secure communications between a controlling device and the communication device. The communication device includes communication logic configured to establish secure wireless communications with the controlling device by causing the controlling device to identify the communication device using the secondary identifier instead of using the primary identifier or the displayed identifier.

In another embodiment, the identifier logic is configured to engage the bootstrap mode in response to a reset request. The identifier logic is configured to disable a previous secondary identifier and generate a new secondary identifier in response to receiving the association request when in the bootstrap mode. The identifier logic is configured to authenticate the association request by verifying that the association request includes either the displayed identifier or the primary identifier. The primary identifier is an out-of-box (OOB) identifier that is assigned to the communication device by a manufacturer of the communication device.

In another embodiment, the association request from the controlling device includes the displayed identifier. The identifier logic is configured to generate the secondary identifier by generating a new public key for the communication device. The controlling apparatus has a master role in a master/slave relationship with the device.

In another embodiment, the identifier logic is configured to generate the secondary identifier by applying a hash function to a public key of a key pair that is assigned to the communication device. The key pair is an asymmetric key pair that is assigned to the communication device when the communication device is manufactured. The primary identifier is the public key. The displayed identifier is displayed on the communication device. The displayed identifier is a quick response (QR) code, a passphrase or a truncated hash of the primary identifier.

In another embodiment, a reset request causes the identifier logic to engage the bootstrap mode and to disable a current secondary identifier. The identifier logic is configured to generate a new secondary identifier in response to receiving a subsequent association request after entering the bootstrap mode.

In another embodiment, the communication logic is configured to use elliptic curve cryptography (ECC).

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with a wireless device that generates a unique transient identifier whenever the wireless device is initialized to communicate with another device. In one embodiment, the wireless device includes a primary identifier that is unique to the wireless device. The primary identifier is, for example, static and does not change. The wireless device then uses a secondary identifier in place of the primary identifier during communications. In this way, the wireless device protects the primary identifier from exposure so that, for example, any future transfer of the wireless device can occur without having previously compromised the primary identifier.

In one embodiment, to achieve security for the primary identifier, the wireless device generates the secondary identifier from the primary identifier. Accordingly, subsequent communications established between the wireless device and one or more remote devices use the secondary identifier instead of the primary identifier to identify the wireless device. In this way, the primary identifier is secured while using the secondary identifier that is transient and can be changed/re-generated if the wireless device is reset to, for example, a manufacturer's default settings.

Figure 1:
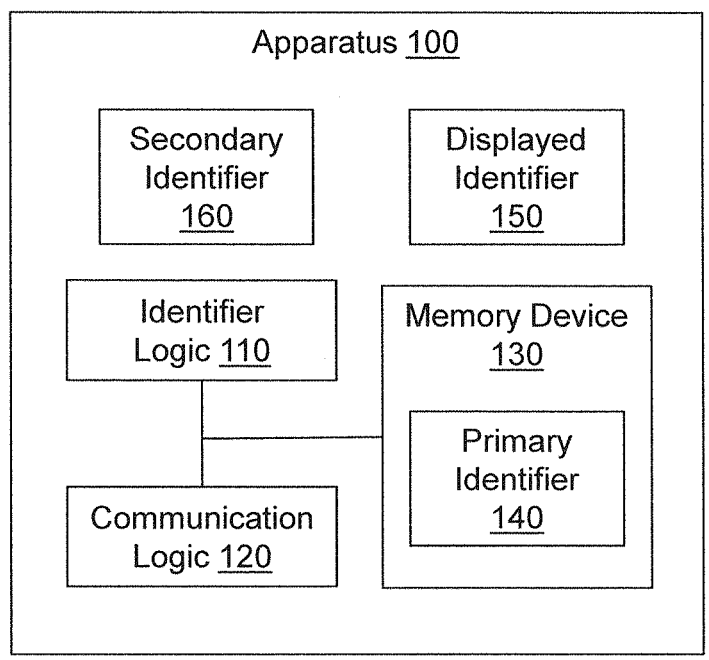
FIG. 1 illustrates one embodiment of an apparatus associated with generating a unique identifier when initialized.
Figure 1:
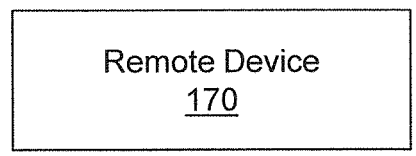

With reference to FIG. 1, one embodiment of an apparatus 100 associated with generating a unique identifier when the apparatus 100 is initialized is illustrated. The apparatus 100 includes identifier logic 110, communication logic 120 and a memory device 130. In one embodiment, the memory device 130 stores a primary identifier 140. The primary identifier 140 is unique to the apparatus 100 in order to uniquely identify the apparatus 100 to other devices. In general, the primary identifier 140 may be a public key of an asymmetric key pair, a media access control (MAC) address for a network interface card (NIC) of the apparatus 100, a random string and so on.

Furthermore, in one embodiment, the primary identifier 140 is assigned to the apparatus 100 by a manufacturer of the apparatus 100. That is, when the apparatus 100 is manufactured, the primary identifier 140 is generated and embedded in the memory device 130. Thus, the primary identifier 140 is, for example, static for the apparatus 100 and does not change.

In one embodiment, the primary identifier 140 may be kept secret or may have limited exposure to other devices. In this way, the primary identifier 140 is not over exposed and maintains a higher level of security for subsequent uses in different locations and for different subsequent owners.

In one embodiment, the apparatus 100 also includes a displayed identifier 150. The displayed identifier 150 is, for example, physically displayed on the apparatus 100. That is, the displayed identifier 150 is displayed on a physical label, a graphical display or on the apparatus 100 in some other form. By providing the displayed identifier 150, a user that physically possesses the apparatus 100 can use the displayed identifier 150 to prove possession/ownership of the apparatus 100 when, for example, attempting to establish initial communications with the apparatus 100.

In one embodiment, the displayed identifier 150 is related to the primary identifier 140. For example, the displayed identifier 150 is determined at the time of manufacture along with the primary identifier 140. Thus, in one example, the displayed identifier 150 is calculated as a function of the primary identifier 140.

Accordingly, the user can input the displayed identifier 150 into a remote device 170 that subsequently uses the displayed identifier 150 to authenticate with the apparatus 100 and initiate secured communications. The displayed identifier 150 permits the apparatus 100 to automatically recognize a communication from the remote device 170 as being valid when the apparatus 100 is in a bootstrap/initialization mode. In this way, secure communications can be established with the apparatus 100 for a limited time during the bootstrap/initialization mode by using the displayed identifier 150 as an authenticator.

Furthermore, in one embodiment, in response to receiving an association request that includes the displayed identifier 150 while in the bootstrap/initialization mode, the identifier logic 110 generates/re-generates a secondary identifier 160. The identifier logic 110 generates the secondary identifier 160 for use by the communication logic 120 as an unique identifier of the apparatus 100 when establishing secure communications with a device that provided the association request (e.g., the remote device 170). In this way, an identifier that is static (e.g., the primary identifier 140 or the displayed identifier 150) is not used with subsequent re-configurations (e.g., "factory resets") of the apparatus 100.

That is, the identifier logic 110 generates the secondary identifier 160 if the apparatus 100 is, for example, in an initialization/bootstrap mode as a result of being "reset" or being fresh out of the box from a manufacturer. This is to maintain security of the primary identifier 140 and the displayed identifier 150 so that the primary identifier 140 and/or the displayed identifier 150 are not registered with different services that may be distributed and difficult to de-register from in the event of the apparatus 100 changing ownership.

Additionally, in one embodiment, the apparatus 100 is a slave device. That is, the apparatus 100 is controlled by a separate device that is a master/controlling device. Accordingly, the apparatus 100 may establish a secure relationship only when first initiated (i.e., when in the bootstrap mode) and with whichever device provides the displayed identifier 150 first. Thus, the apparatus 100 may associate with just the remote device 170 or a limited set of devices associated with the remote device 170 and use the secondary identifier 160 for communicating with that limited set of devices.

Accordingly, while the bootstrap mode is engaged an association request received by the apparatus 100 will cause the identifier logic 110 to generate the secondary identifier 160 for identifying the apparatus 100 during a present life cycle of use. The identifier logic 110 generates the secondary identifier 160 by, for example, hashing the primary identifier 140, generating a new public key for the apparatus 100 as the secondary identifier 160, generating a pseudorandom number and so on. In general, the identifier logic 110 generates the secondary identifier 160 to be unique and to conform with whichever security standard that may govern interactions with the apparatus 100 (e.g., WiFi protected setup (WPS), IEEE 802.11 wireless security standards, etc.).

Subsequently, the communication logic 120 uses the secondary identifier 160 to establish a secure relationship (e.g., encrypted communications) with the remote device 170 instead of using the primary identifier 140 or the displayed identifier 150 as an unique identifier of the apparatus 100. Of course, as previously mentioned, the association request from the remote device 170 may include authentication information such as the primary identifier 140 or the displayed identifier 150 of the apparatus 100 so that the apparatus 100 can authenticate the remote device 170. However, communication logic 120 causes the remote device 170 to use the secondary identifier 160 to ultimately identify the apparatus 100 and not the primary identifier 140 or the displayed identifier 150.

Once associated with the remote device 170, the apparatus 100 transitions out of the bootstrap mode and the secondary identifier 160 is used for communications between the apparatus 100 and the remote device 170 until, for example, the apparatus 100 is reset. When the apparatus 100 is reset, the above described process of generating the secondary identifier 160 and establishing secure communications occurs similarly but with a different secondary identifier 160. Thus, the apparatus 100 can be identified using a transient unique identifier whenever reset and can thus avoid re-using the displayed identifier 150 or the primary identifier 140 with subsequent devices when transferred between owners.

Figure 2:
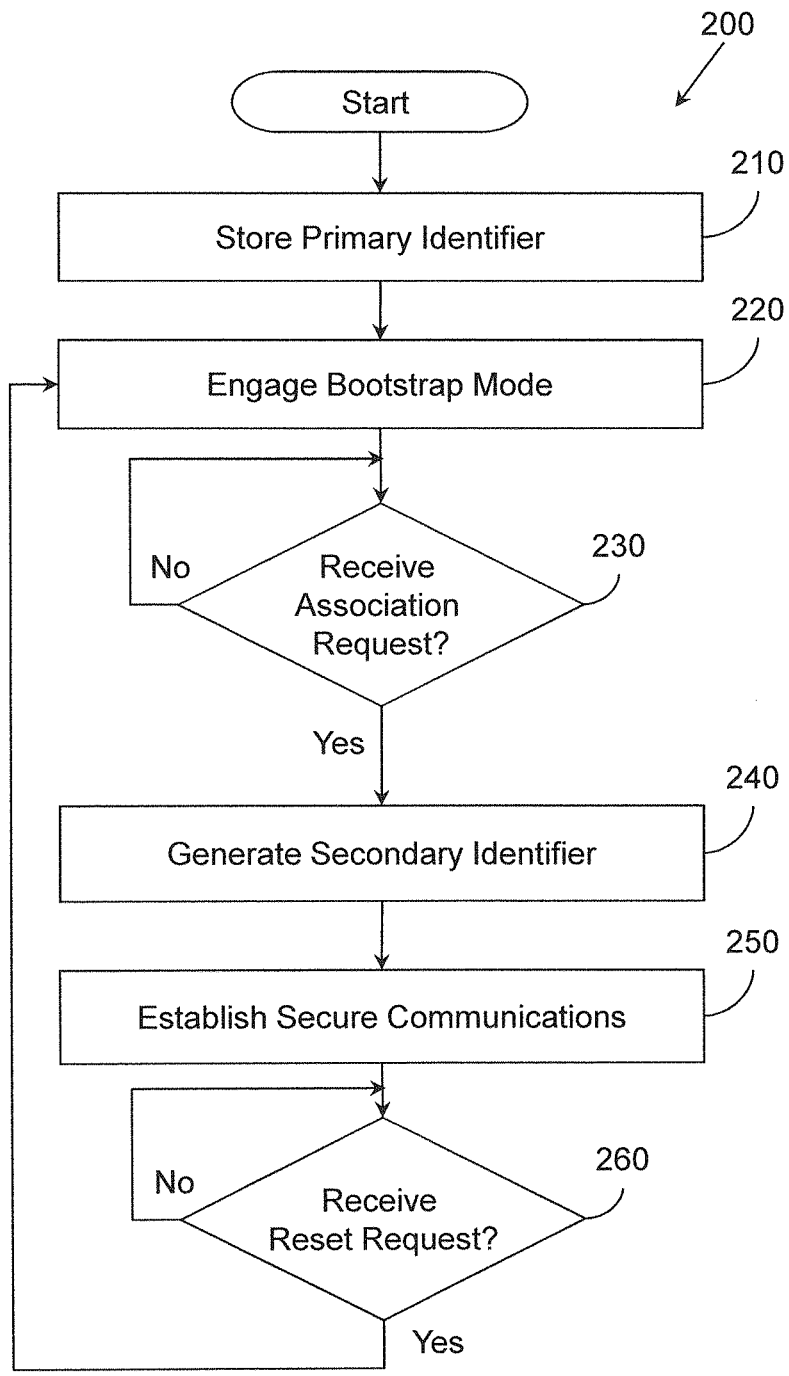
FIG. 2 illustrates one embodiment of a method associated with using a unique transient secondary identifier that is generated/re-generated upon a reset.

Further aspects of the apparatus 100 and how the apparatus 100 generates/re-generates transient identifiers will be discussed in relation to FIG. 2. FIG. 2 illustrates a method 200 associated with generating a transient secondary identifier of an apparatus (e.g., the apparatus 100). FIG. 2 will be discussed from the perspective of the apparatus 100 of FIG. 1. Additionally, FIG. 2 will be discussed along with a general example of how the apparatus 100 is initially configured from the manufacturer and subsequently operates.

At 210, the primary identifier 140 is stored. In one embodiment, storing the primary identifier occurs when the apparatus 100 is initially manufactured. That is, a manufacturer of the apparatus 100 generates or causes the apparatus 100 to generate the primary identifier 140 and stores the primary identifier 140 in the memory device 130. The primary identifier 140 is an out-of-box (OOB) identifier that is unique to the apparatus 100. As previously discussed, the primary identifier 140 may be a public key or some other unique identifying string.

However, if the primary identifier 140 were used to identify the apparatus 100 to each device and/or service that may communicate with the apparatus 100, then confidentiality/ security of the primary identifier 140 would be compromised. This is because, in one embodiment, the primary identifier 140 is static and does not change.

Thus, each service/device that establishes a relationship with the apparatus 100 maintains a unique identifier of the apparatus 100, which would be the primary identifier 140. Accordingly, if the apparatus 100 was transferred to a different owner, then the apparatus 100 would carry over permissions established with the devices/services from a previous owner, which is undesirable and insecure. Therefore, the primary identifier 140 is not used to identify the apparatus on a long-term basis, but instead may be used to just initially establish a secure relationship.

Furthermore, at 210, as part of storing the primary identifier 140, the displayed identifier 150 may also be generated and stored. In one embodiment, the displayed identifier 150 is generated as a function of the primary identifier 140 (e.g., truncated hash of the primary identifier 140). In either case, once generated the displayed identifier 150 is displayed/displayable to a user that is in possession of the apparatus 100. That is, the displayed identifier 150 is printed on a label, embossed on a surface, rendered on a display of the apparatus 100 and so on. In one embodiment, the displayed identifier 150 is a quick response (QR) code, a passphrase or a truncated hash of the primary identifier 140 and so on.

The following elements 220-260 describe how the apparatus generates/re-generates a unique identifier to use instead of the primary identifier 140 and/or the displayed identifier 150 so that confidentiality of the primary identifier 140 and/or the displayed identifier 150 can be maintained.

At 220, a bootstrap/initialization mode is engaged. In one embodiment, the bootstrap mode is engaged whenever a button is pressed on the apparatus 100, when the apparatus 100 is newly manufactured, or whenever some process engages the bootstrap mode to reset the apparatus 100. In general, the bootstrap/initialization mode is a state of the apparatus 100 during which the apparatus 100 is initializing and is open for establishing new associations/connections with devices and/or services.

In one embodiment, the bootstrap/initialization mode includes disabling and/or deleting a previous secondary identifier that was in use prior to engaging the bootstrap/initialization mode. In this way, a new secondary identifier can be subsequently generated for establishing new secure communications while ensuring previously established relationships are no longer valid and can't be exploited by a subsequent owner of the apparatus 100.

At 230, a check is made to determine whether an association request has been received. In one embodiment, an association request is a request received from a device (e.g., the remote device 170) or service to communicate with the apparatus 100. The association request may be a request of a controlling device (e.g., master of a master/slave relationship) to control the apparatus 100.

Thus, the controlling device may be the only device with which the apparatus 100 communicates. For example, if the apparatus 100 is a hot water heater, thermostat, fitness tracker (e.g., pedometer) or other device that is associated with only one or a limited set of devices, then only a single device may need to communicate with the apparatus 100.

If no association request is received, then monitoring for an association request continues until one is received. If an association request is received at 230, the association request is first, for example, analyzed to determine if the association request includes the displayed identifier 150 or the primary identifier 140. In this way, the association request can be authenticated as being from a valid device (e.g., the remote device 170) since it is assumed that whichever device knows the primary identifier 140 and/or the displayed identifier 150 is a valid device in possession of the apparatus 100.

Accordingly, at 240, in response to a valid association request, a new and unique secondary identifier 160 is generated. For example, each time that the apparatus 100 is reset and placed into the bootstrap/initialization mode and subsequently receives a valid association request, the secondary identifier 160 is generated/re-generated as a different unique identifier. In this way, the secondary identifier 160 is transient/ephemeral. In one embodiment, the secondary identifier 160 is a new public key of an asymmetric key pair of the apparatus 100. In another embodiment, the secondary identifier 160 is generated according to elliptic curve cryptography (ECC), as a hash of the primary identifier 140, a truncated hash of the primary identifier 140, a random string or as any other string that uniquely defines the apparatus 100 and which has not been previously used to identify the apparatus 100.

At 250, the secondary identifier 160 generated at 240 is used to establish a secure relationship through secure communications with a device (e.g., remote device 170) that provided the association request at 230. In general, the apparatus 100 causes the remote device 170 to use the secondary identifier 160 instead of the primary identifier 140 or the displayed identifier 150 to identify the apparatus 100. In this way, an identifier that can be easily changed but that still uniquely identifies the apparatus 100 can be used when establishing and maintaining communications.

Furthermore, the secure communications are established using, for example, near-field communications to exchange information or some other wireless form of communication (e.g., communications that conform with IEEE 802.11 protocols).

After secure communications have been established, the bootstrap/initialization mode is disengaged and secure communications according to the secure relationship established at 250 continue until a reset request is received at 260.

At 260, if a reset request is received in response to a request to reset to manufacturer defaults, then the bootstrap/initialization mode is engaged once again at 220 and re-generation of the secondary identifier 160 occurs as previously specified.

Figure 3:
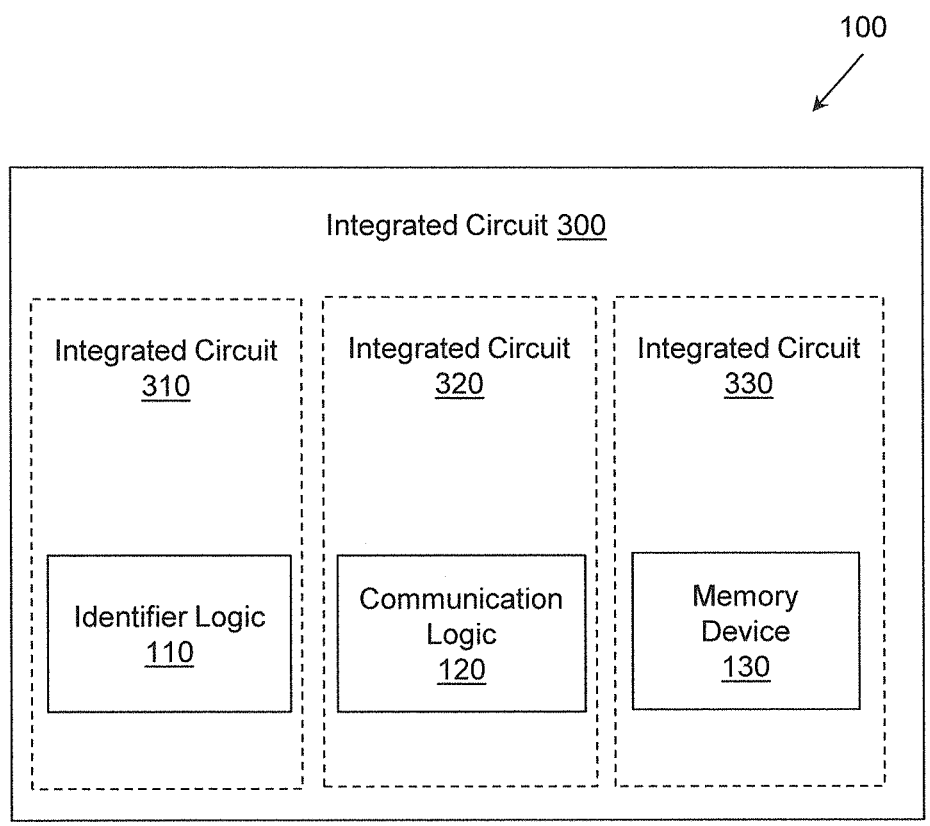
FIG. 3 illustrates one embodiment of an integrated circuit associated with re-generating a secondary identifier whenever a device is reset.

FIG. 3 illustrates an additional embodiment of the apparatus 100 from FIG. 1 that is configured with separate integrated circuits and/or chips. In this embodiment, the identifier logic 110 from FIG. 1 is embodied as a separate integrated circuit 310. Additionally, the communication logic 120 is embodied on an individual integrated circuit 320. The memory device 130 is also embodied on an individual integrated circuit 330. The circuits are connected via connection paths to communicate signals. While integrated circuits 310, 320, and 330 are illustrated as separate integrated circuits, they may be integrated into a common circuit board 300. Additionally, integrated circuits 310, 320, and 330 may be combined into fewer integrated circuits or divided into more integrated circuits than illustrated. Additionally, in another embodiment, the identifier logic 110 and the communication logic 120 illustrated in integrated circuits 310 and 320 may be combined into a separate application specific integrated circuit.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. An apparatus, comprising:
    a memory device that stores a primary identifier that is unique to the apparatus, wherein the primary identifier correlates with a displayed identifier of the apparatus that is used by a remote device to initiate communications with the apparatus;
    identifier logic stored on a non-transitory computer-readable medium and including instructions that when executed by one or more processors of the apparatus cause the apparatus to at least generate a secondary identifier in response to receiving an association request that includes the displayed identifier when the apparatus is in a bootstrap mode, wherein the bootstrap mode is a state of the apparatus when the apparatus is initializing and will accept a new association with the remote device, wherein the association request is a wireless communication that initiates establishing secure communications between the remote device and the apparatus, and
    wherein the identifier logic is configured to generate the secondary identifier by (i) disabling a previously generated secondary identifier and (ii) generating the secondary identifier again as a different identifier in response to receiving the association request when in the bootstrap mode; and
    communication logic stored on a non-transitory computer-readable medium and including instructions that when executed by the one or more processors of the apparatus cause the apparatus to at least establish secure wireless communications with the remote device by causing the remote device to identify the apparatus using the secondary identifier instead of using the primary identifier.

2. The apparatus of claim 1, wherein the identifier logic is configured to engage the bootstrap mode in response to a reset request.

3. The apparatus of claim 1, wherein the association request is from the remote device and includes the displayed identifier, wherein the identifier logic is configured to generate the secondary identifier by generating a new public key for the apparatus, and wherein the remote device is a management device that controls the apparatus.

4. The apparatus of claim 1, wherein the identifier logic is configured to generate the secondary identifier by applying a hash function to a public key of a key pair that is assigned to the apparatus, wherein the key pair is an asymmetric key pair that is assigned to the apparatus when the apparatus is manufactured, and wherein the primary identifier is the public key.

5. The apparatus of claim 1, wherein the apparatus is configured to display or includes an area that displays the displayed identifier, wherein the displayed identifier is a quick response (QR) code, a passphrase or a truncated hash of the primary identifier, wherein the primary identifier is an out-of-box (OOB) identifier that is assigned to the apparatus by a manufacturer of the apparatus and wherein the primary identifier is a media access control (MAC) address, a public key or a random string.

6. The apparatus of claim 1, wherein the apparatus includes a button configured to, in response to being activated, provide a reset request to the communication logic, wherein the reset request causes the identifier logic to enter the bootstrap mode and to disable the secondary identifier, and wherein the identifier logic is configured to generate a new secondary identifier in response to receiving a subsequent association request after entering the bootstrap mode.

7. The apparatus of claim 1, wherein the communication logic is configured to establish the secure wireless communications according to a WiFi protected setup (WPS) protocol, wherein the communication logic is configured to establish the secure communications by using near-field communications to exchange information with the remote device, and wherein the remote device is a master device of the apparatus and wherein the communication logic is configured to use elliptic curve cryptography (ECC) to encrypt the secure wireless communications.

8. A method, comprising:
   storing, in a memory device of an apparatus, a primary identifier that is unique to the apparatus, wherein the primary identifier correlates with a displayed identifier of the apparatus that is used by a remote device to initiate communications with the apparatus;
   generating, by the apparatus, a secondary identifier in response to receiving an association request that includes the displayed identifier when the apparatus is in a bootstrap mode, wherein the bootstrap mode is a state of the apparatus when the apparatus is initializing and is open for a new association, and wherein the association request is a wireless communication that initiates establishing secure communications between the remote device and the apparatus, and
   wherein generating the secondary identifier when in the bootstrap mode includes disabling a previously generated secondary identifier and generating a new secondary identifier in response to receiving the association request; and
   establishing secure wireless communications with the remote device by causing the remote device to identify the apparatus using the secondary identifier instead of using the primary identifier.

9. The method of claim 8, further comprising:
   engaging the bootstrap mode in response to a reset request, wherein the primary identifier is an out-of-box (OOB) identifier that is assigned to the apparatus by a manufacturer of the apparatus and wherein the primary identifier is a media access control (MAC) address, a public key or a random string.

10. The method of claim 8, wherein the association request includes the displayed identifier from the remote device, wherein generating the secondary identifier includes generating a new public key for the apparatus, and wherein establishing the secure wireless communications includes the apparatus receiving management and control commands from the remote device.

11. The method of claim 8, wherein generating the secondary identifier includes applying a hash function to a public key of a key pair that is assigned to the apparatus, wherein the key pair is an asymmetric key pair that is assigned to the apparatus when the apparatus is manufactured, and wherein the primary identifier is the public key.

12. The method of claim 8, wherein the displayed identifier is displayed on the apparatus, and wherein the displayed identifier is a quick response (QR) code, a passphrase or a truncated hash of the primary identifier.

13. The method of claim 8, wherein a reset request is provided in response to a button of the apparatus being depressed, and wherein generating the secondary identifier includes generating a new secondary identifier in response to receiving a subsequent association request after engaging the bootstrap mode.

14. The method of claim 8, wherein establishing the secure wireless communications uses a WiFi protected setup (WPS) protocol, and wherein establishing the secure wireless communications uses near-field communications to exchange information with the remote device, wherein the remote device is a master device of the apparatus, and wherein establishing the secure wireless communications includes using use elliptic curve cryptography (ECC) to encrypt the secure wireless communications.

15. A communication device comprising:
   a processor;
   a memory device that stores a primary identifier that is unique to the communication device, wherein the primary identifier correlates with a displayed identifier of the communication device that is displayed on a label of the communication device
   wherein the memory device includes a non-transitory computer-readable medium storing instructions that when executed by the processor cause the communication device to at least
   engage a bootstrap mode for initializing the communication device;
   generate a secondary identifier in response to receiving an association request when the communication device is in a bootstrap mode, wherein the bootstrap mode is a state when the device accepts association requests, wherein the association request is a wireless communication that initiates establishing secure communications between a controlling device and the communication device,
   wherein generating the secondary identifier includes (i) disabling a previous secondary identifier and (ii) generating a new secondary identifier; and
   establish secure wireless communications with the controlling device by causing the controlling device to identify the communication device using the secondary identifier instead of using the primary identifier or the displayed identifier.

16. The communication device of claim 15, wherein the instructions that cause the communication device to engage the bootstrap mode are triggered in response to a reset request, wherein the instructions that cause the computing device to authenticate the association request include instructions for verifying that the association request includes either the displayed identifier or the primary identifier and wherein the primary identifier is an out-of-box (OOB) identifier that is assigned to the communication device by a manufacturer of the communication device.

17. The communication device of claim 15, wherein the association request from the controlling device includes the displayed identifier, wherein the instructions that cause the communication device to generate the secondary identifier include instructions for generating a new public key for the communication device, and wherein the controlling apparatus has a master role in a master/slave relationship with the device.

18. The communication device of claim 15, wherein the instructions that cause the communication device to generate the secondary identifier include instructions for applying a hash function to a public key of a key pair that is assigned to the communication device, wherein the key pair is an asymmetric key pair that is assigned to the communication device when the communication device is manufactured, wherein the primary identifier is the public key, wherein the displayed identifier is displayed on the communication device, and wherein the displayed identifier is a quick response (QR) code, a passphrase or a truncated hash of the primary identifier.

19. The communication device of claim 15, wherein a reset request causes the communication device to engage the bootstrap mode and to disable a current secondary identifier, and wherein the instructions include instructions that cause the communication device to generate a new secondary identifier in response to receiving a subsequent association request after entering the bootstrap mode.

20. The communication device of claim 15, wherein the instructions include instructions that cause the communication device to use elliptic curve cryptography (ECC) to establish the secure wireless communications.

\* \* \* \* \*